United States Patent [19]
Morikawa et al.

[11] Patent Number: 5,730,814
[45] Date of Patent: Mar. 24, 1998

[54] PNEUMATIC RADIAL TIRE WITH ZIGZAG STEEL CORD BELT LAYER

[75] Inventors: Tuneo Morikawa; Kazuyuki Kabe; Shuji Takahashi, all of Hiratsuka, Japan

[73] Assignee: The Yokohama Rubber Co., Ltd., Tokyo, Japan

[21] Appl. No.: 645,076

[22] Filed: May 13, 1996

[30] Foreign Application Priority Data

May 15, 1995 [JP] Japan ................. 7-116039

[51] Int. Cl.⁶ .................... B60C 9/18; B29D 30/70
[52] U.S. Cl. ............... 152/527; 152/526; 152/533; 152/537; 156/117
[58] Field of Search .................. 152/527, 533, 152/526, 537; 156/117, 177

[56] References Cited

U.S. PATENT DOCUMENTS

| | | | |
|---|---|---|---|
| 3,550,667 | 12/1970 | Bartley et al. | 152/533 |
| 3,674,079 | 7/1972 | Varner | 152/533 X |
| 3,802,982 | 4/1974 | Alderfer | 152/533 X |
| 4,838,966 | 6/1989 | Oswald | 156/117 |
| 5,295,346 | 3/1994 | Bundo et al. | 152/527 X |
| 5,332,017 | 7/1994 | Imamiya et al. | 152/527 |

*Primary Examiner*—Adrienne C. Johnstone
*Attorney, Agent, or Firm*—Nikaido, Marmelstein, Murray & Oram LLP

[57] ABSTRACT

A pneumatic radial tire includes a cylindrical steel cord belt layer having a two-layered structure is formed by winding a tape obtained by burying one or a plurality of steel cords in parallel with one another in a matrix, round the outer circumference of a carcass layer on a tread while bending the tape zigzag.

7 Claims, 7 Drawing Sheets

One round of zigzag bent tape n=1 n=2 n=3 n=4 n=5 n=6

5,730,814

1

PNEUMATIC RADIAL TIRE WITH ZIGZAG STEEL CORD BELT LAYER

BACKGROUND OF THE INVENTION

This invention relates to a pneumatic radial tire having good high speed durability and excellent in uniformity, maneuvering stability and driving comfort.

A steel cord belt layer utilizing an excellent strength and a high elastic modulus of a steel cord has been used in the past for a belt portion of a pneumatic radial tire. This steel cord belt layer has a structure wherein steel cords are disposed at a relatively small angle (10° to 30°) in a tire circumferential direction, and cross one another between plies, and a cut fracture exists at both side edges in a transverse direction thereof. Therefore, the pneumatic radial tire is not free from the drawbacks that a stress concentrates on the cut fracture, separation is therefore likely to occur between the steel cords and a coat rubber, and high speed durability drops.

SUMMARY OF THE INVENTION

It is therefore an object of the present invention to provide a pneumatic radial tire which has good high speed durability without using auxiliary means such as an organic fiber cover layer, though it uses steel cords for a belt layer, and is moreover excellent in uniformity, maneuvering stability and driving comfort.

In a pneumatic radial tire having a belt layer disposed outside a carcass layer on a tread, the object of the present invention described above can be accomplished by a pneumatic radial tire characterized in that a tape formed by burying one or a plurality of steel cords in parallel with one another in a matrix, is wound round the outer circumference of the carcass layer while being bent zigzag in such a manner as to form a cylindrical steel cord belt layer having a two-layered structure, a cord angle θ of the steel cord belt layer in a tire circumferential direction, a width D of the steel cord belt layer, a radius r of the cylinder of the steel cord belt layer and the number of zigzag bendings n of the tape per circumference of the tire satisfy the relation $\tan \theta = n \times D/2\pi r$ and $7° < \theta < 20°$, and the steel cord comprises a 0.15 to 0.5 mm-diameter single steel wire shaped into a spiral or corrugated shape in the longitudinal direction thereof or has an a×b twist structure (a=1 to 4 and b=2 to 5) having a blank wire diameter of 0.1 to 0.25 mm.

Here, the term "radius r of the cylinder" means the distance from the axis of rotation of the tire to the inner side surface of the cylindrical steel cord belt layer having the two-layered structure on the equator of the tire.

Because the steel cord belt layer is formed by winding the tape round the outer circumference of the carcass layer while being bent as described above, a cut fracture does not exist at both side edges of the steel cord belt layer (belt edge portions) in the transverse direction, and the possibility of occurrence of separation on the cut fracture is small. Accordingly, high speed durability can be improved.

Because the steel cord belt layer is formed by winding the tape round the outer circumference of the carcass layer while being bent, an overlap portion (splice portion) does not occur in comparison with the conventional pneumatic radial tires wherein both end portions of a steel cord rubber-lined sheet for the belt layer are overlapped so as to form the belt layer. Therefore, uniformity (UF) can be improved, and radial force variation (RFV) representing the change of the reaction which the tire receives in the radial direction can be reduced, in particular.

2

Moreover, because the steel cord belt layer having a high rigidity is disposed at the belt portion without the cords being cut, the steel cord belt layer secures transverse rigidity of the tire. For this reason, maneuvering stability is not deteriorated.

Because uniformity (UF) can be improved as described above, driving comfort can be improved. However, if the width of the tape is excessively increased, bending becomes difficult and moreover, non-uniformity of rigidity increases undesirably between the winding start edge (winding end edge) of the tape and other portions. Accordingly, the tape width is preferably not greater than 15% of the width D of the steel cord belt layer (belt bending width).

DESCRIPTION OF THE PREFERRED EMBODIMENTS

Figure 1:
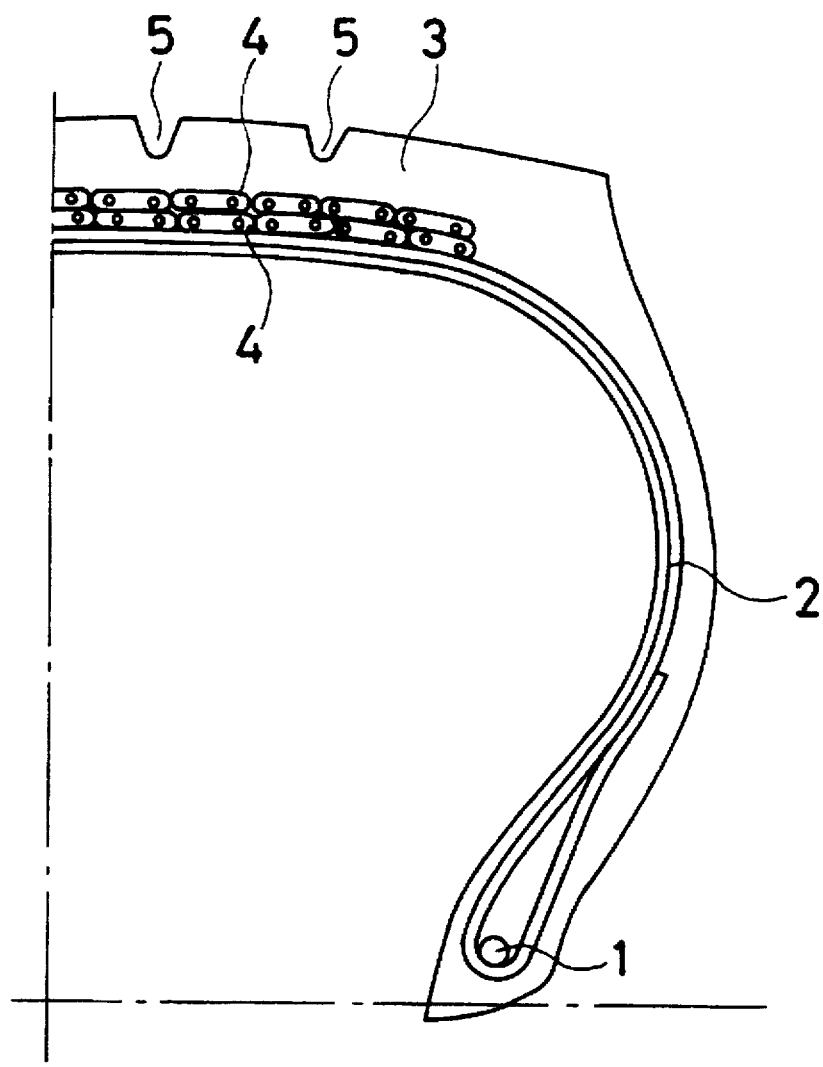
FIG. 1 is a semi-sectional explanatory view of a pneumatic radial tire in a meridian direction according to one embodiment of the present invention.

Referring to FIG. 1, the end portion of a carcass layer 2 is turned up from inside to outside of the tire around each of the pair of right and left bead cores 1, and a steel cord belt layer 4 is disposed outside the carcass layer 2 on a tread 3 in such a manner as to extend throughout the circumference of the tire in a tire circumferential direction. In FIG. 1, the steel cord belt layer 4 has a two-layered or even-numbered layered structure but the number of layers may be four (4) or six (6) so long as the layers are even-numbered layers.

A plurality of grooves 5 extending in the tire circumferential direction and a plurality of grooves (not shown in the drawing) in a tire width-wise direction are disposed on the surface of the tread 3, that is, on the tread surface.

Figure 2:
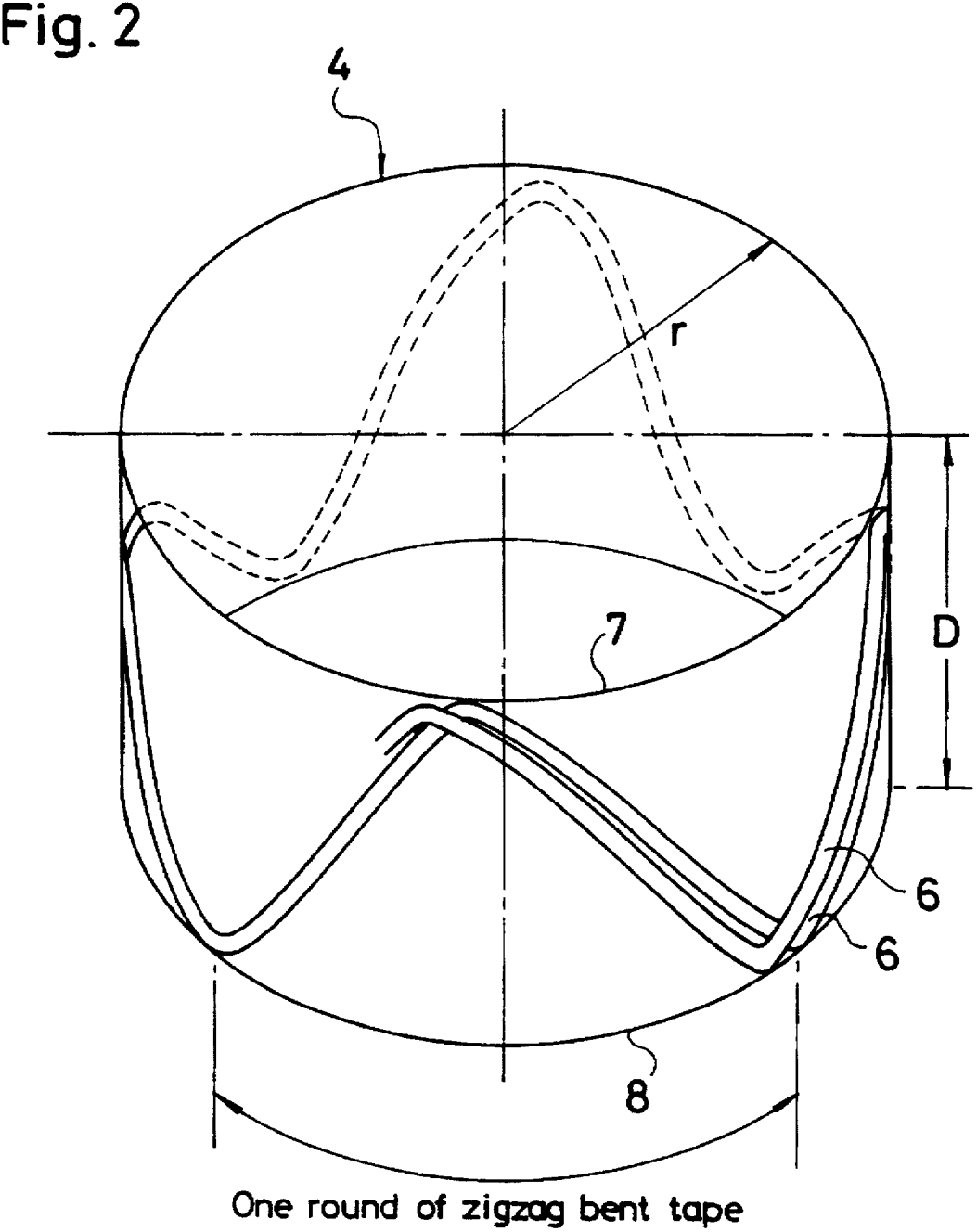
FIG. 2 is a perspective explanatory view showing the formation state of a steel cord belt layer in the present invention.

The steel cord belt layer 4 is formed, as shown in FIG. 2, by moving zigzag tapes 6, which are in turn formed by burying one or a plurality of steel cords 1, preferably five to ten steel cords, in a matrix in parallel with one another, with an even-numbered or odd-numbered number of bendings throughout the circumference of the tire of the carcass layer 2 in the transverse direction of the tire, and winding the tapes 6 on the outer circumference of the carcass layer 2 while bending the tapes at the corresponding end portions 7 and 8 of the steel cord belt layer 4 in the transverse direction. This winding work is carried out a large number of times in the tire circumferential direction while the winding position is deviated by the distance corresponding to the width of the tape 6 lest gaps are formed between the tapes 6. This winding state will be explained with reference to FIG. 3.

Figure 3:
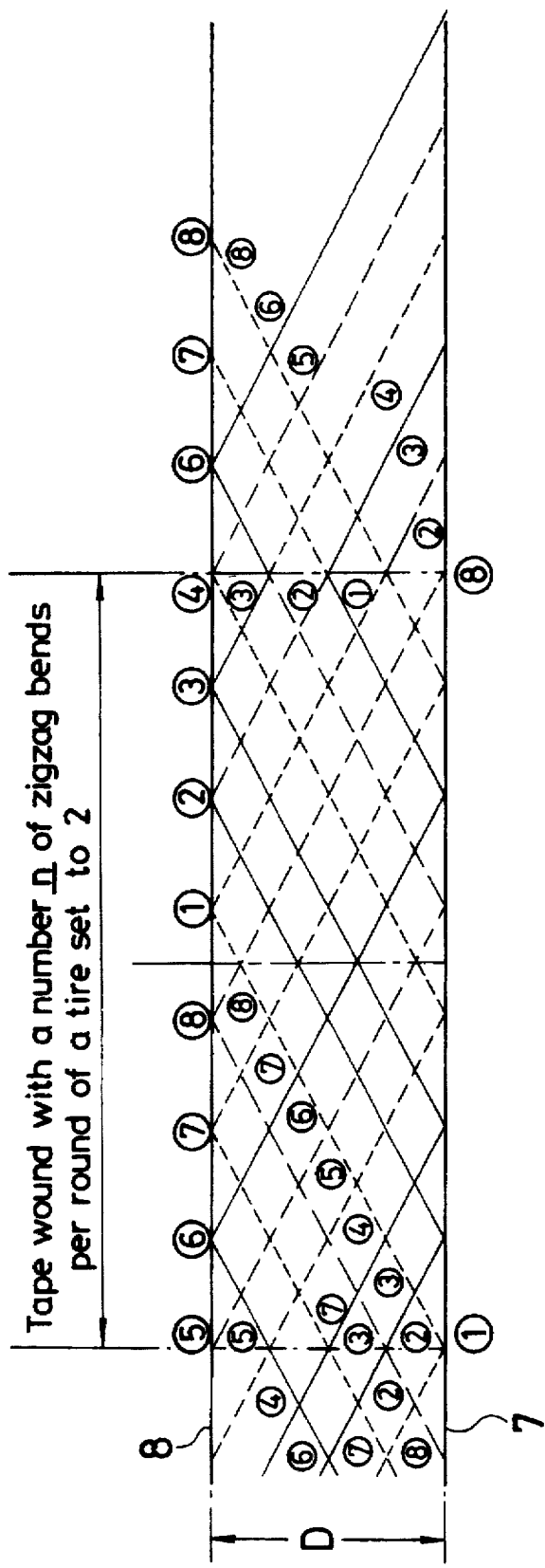
FIG. 3 is an explanatory view showing a winding state of a tape to a carcass layer when the steel cord belt layer is formed in the present invention.

FIG. 3 shows the case where the number of zigzag bending of the tape 6 per circumference of the tire is n=2. In FIG. 3, the winding start tape ① starts at one of the corresponding end portions 7 in the transverse direction, is bent at the other corresponding end portions 8 in the transverse direction, returns to one of the corresponding end portions 7 and then connects with the next tape ②, which is bent at the one of the corresponding end portions 7 of the belt layer 4 in the transverse direction while the winding position is deviated by the distance substantially corresponding to the tape width with respect to the winding start tape ① in the tire circumferential direction. This winding operation is sequentially repeated for the tapes ② to ⑧. Therefore, since two tapes 6 are always superposed with each other as a whole, the resulting steel cord belt layer 4 has a two-layered (double layer) structure. Though the number of the steel cord belt layers 4 may be even, one double layer is preferably formed from the aspects of the cost and the weight.

Figure 4:
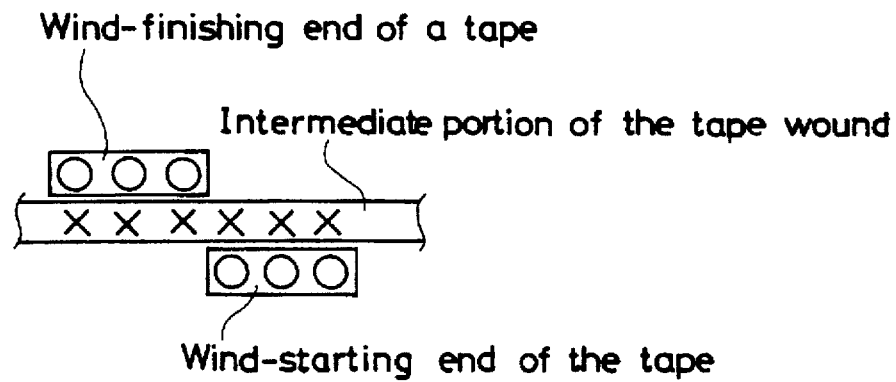
FIG. 4 is a sectional explanatory view showing the state where a step is formed between the start of winding of the tape and the end through the tape at an intermediate portion.
Figure 5:
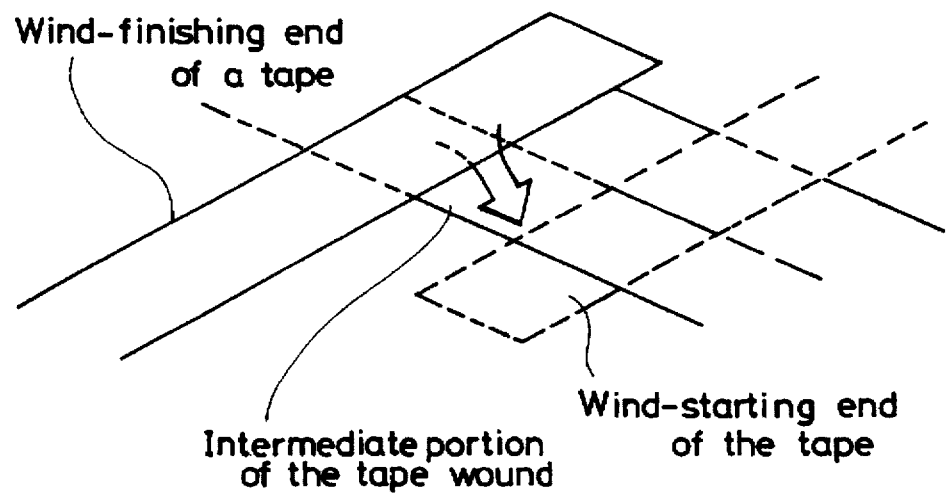
FIG. 5 is a planar explanatory view showing the state where the step is formed between the start of winding of the tape and the end through the tape at the intermediate portion.

Incidentally, when the number n of zigzag bendings of the tape 6 per circumference of the tire is even, steps occurs concentratedly through the tape at the intermediate portion between the winding start edge of the winding start tape ① and the winding end edge of the winding end tape ⑧ as shown in FIGS. 4 and 5. These steps are not preferable for uniformity of the tire.

Figure 6:
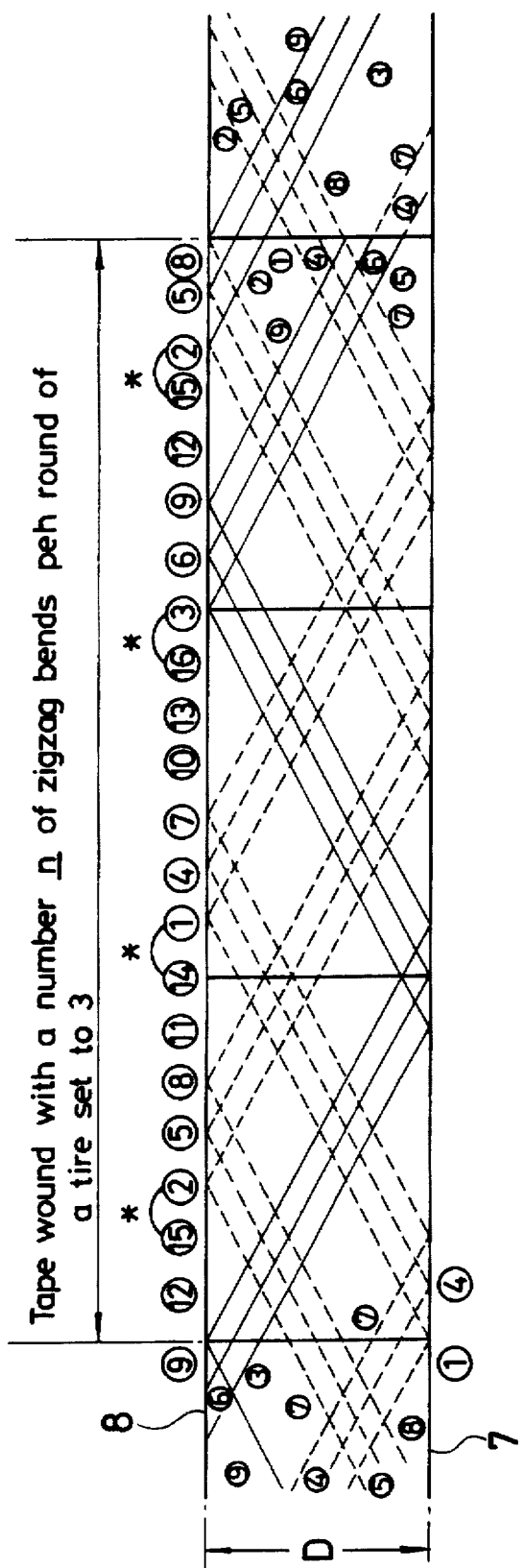
FIG. 6 is another explanatory view showing the state where the tape is wound on the carcass layer when the steel cord belt layer is formed in the present invention.

To further improve uniformity of the tire, it is advisable to set the number n of zigzag bendings of the tapes 6 per circumference of the tire to an odd number. When the number of zigzag bendings is the odd number, the step does not concentratedly occur between the winding starting edge of the winding start tape and the winding end edge of the winding end tape as represented by asterisk "*" in FIG. 6, and the step occurs between the tapes which are under winding, so that the steps are dispersed throughout the circumference of the tire.

Figure 7:
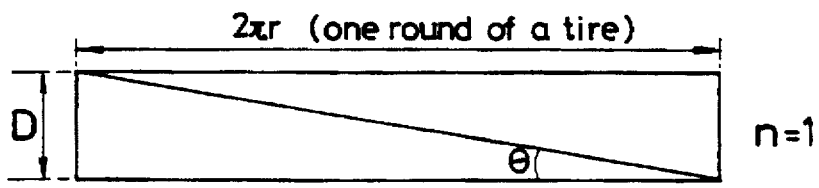
FIG. 7 is a relational diagram between the number of zigzag bending n=1 of the tape per circumference of the tire and a cord angle θ of the steel cord belt layer with respect to a tire circumferential direction.
Figure 8:
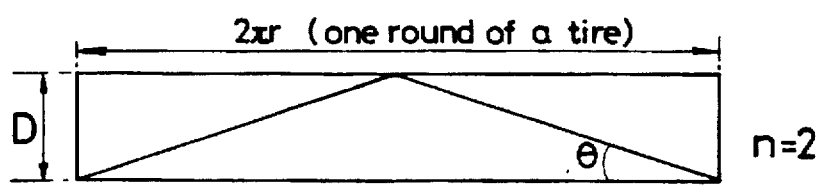
FIG. 8 is a relational diagram between the number of zigzag bendings n=2 of the tape per circumference of the tire and the cord angle θ of the steel cord belt layer in the tire circumferential direction.
Figure 9:
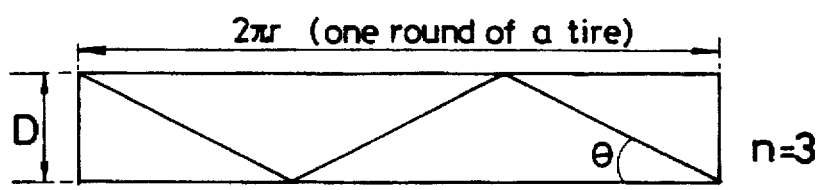
FIG. 9 is a relational diagram between the number of zigzag bendings n=3 of the tape per circumference of the tire and the cord angle θ of the steel cord belt layer in the tire circumferential direction.
Figure 10:
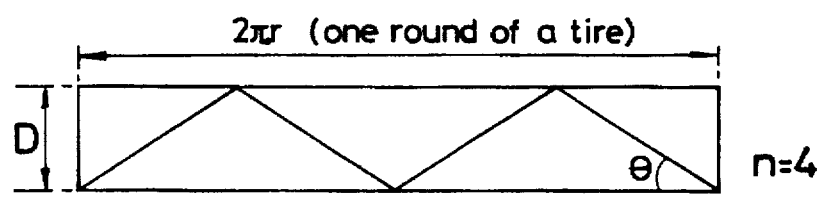
FIG. 10 is a relational diagram between the number of zigzag bendings n=4 of the tape per circumference of the tire and the cord angle θ of the steel cord belt layer in the tire circumferential direction.
Figure 11:
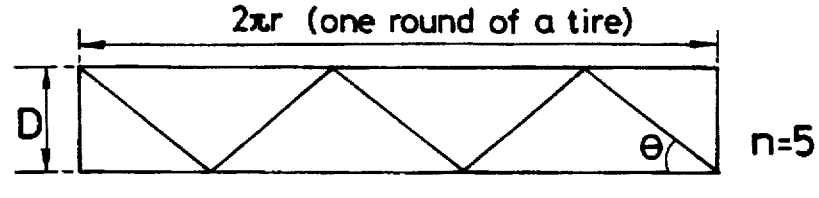
FIG. 11 is a relational diagram between the number of zigzag bendings n=5 of the tape per circumference of the tire and the cord angle θ of the steel cord belt layer in the tire circumferential direction.
Figure 12:
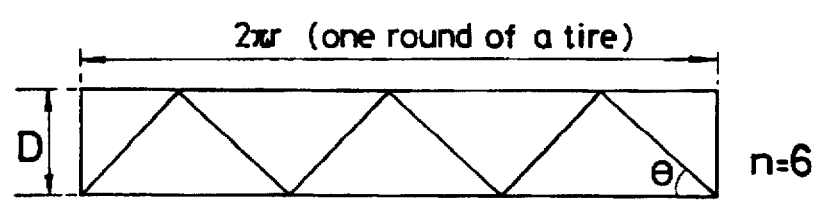
FIG. 12 is a relational diagram between the number of zigzag bendings n=6 of the tape per circumference of the tire and the cord angle θ of the steel cord belt layer in the tire circumferential direction.

Next, the relation between the number n of zigzag bendings of the tape 6 per circumference of the tire and the cord angle θ of the steel cord belt layer 4 in the tire circumferential direction is shown in FIGS. 7 to 12. FIG. 7 shows the case of n=1, FIG. 8 shows the case of n=2, FIG. 9 shows the case of n=3, FIG. 10 shows the case of n=4, FIG. 11 shows the case of n=5 and FIG. 12 shows the case of n=6. As can be clearly understood from FIGS. 7 to 12, the cord angle θ becomes greater with an increasing n value. Therefore, in order to keep the cord angle θ within the range of θ=7 to 20°, the present invention sets the number of bendings n to two or four in the case of the even number and three or five in the case of the odd number.

In the steel cord belt layer 4 of the present invention formed in the manner described above, the cord angle θ is so set as to satisfy the relation $\tan\theta = n \times d/2\pi r$ and to be within the range of $7° < \theta < 20°$ when the cord angle in the tire circumferential direction is θ, the width is D, the radius of the cylinder is r and the number of zigzag bendings of the tape 6 per circumference of the tire is n. For, the cord angle θ is determined by the number n, the width D and the radius r of the cylinder. The reason why θ is set to be within $7° < \theta < 20°$ is to improve rigidity in the tire circumferential direction by reducing as much as possible the cord angle θ and to improve high speed durability.

The steel cord used for the tape 6 comprises a 0.15 to 0.5 mm-diameter steel single wire shaped into a spiral or corrugated shape in its longitudinal direction, or has an a×b twist structure (a=1 to 4, b=2 to 5) of blank wires having a diameter of 0.1 to 0.25 mm. The steel cord is constituted in this manner because in order to wind the tape 6 round the outer circumference of the carcass layer while bending it zigzag, the steel cord must have a small bending rigidity. The steel cord comprising a steel single wire is shaped into the spiral or corrugated shape in its longitudinal direction because, when the cord angle θ is set to a small value within the range of $7° < \theta < 20°$ as described above, the steel cord belt layer 4 cannot easily follow up the expansion of the tire diameter at the time of vulcanization of the tire unless the steel cord is shaped into such a shape. In other words, shaping of the steel cord as described above allows the steel cord to smoothly elongate in the longitudinal direction and also allows the steel cord belt layer 4 to easily follow up the expansion of the tire diameter.

Figure 13:
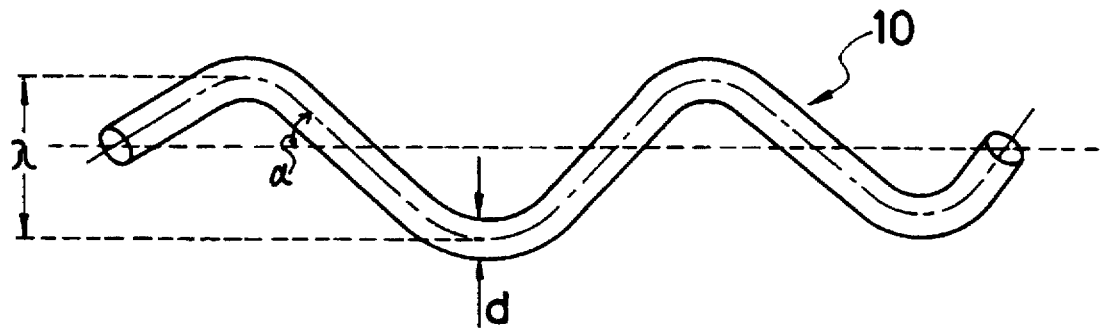
FIG. 13 is a side explanatory view of a steel cord comprising a single wire shaped into a spiral or corrugated shape in the longitudinal direction.

When the steel cord comprises a 0.15 to 0.5 mm-diameter steel single wire shaped into the spiral or corrugated shape in the longitudinal direction, it satisfies the relation $1.0 (mm) \geq d+\lambda$ and $0.30 \geq \tan\alpha > 0.05$ where d is the diameter of the single wire 10 (mm), λ is the amplitude of the single wire 10 (mm) as shown in FIG. 13 and α is the angle of inclination of the single wire 10 with respect to the axis of the cord longitudinal direction. When d+λ exceeds 1.0 (mm), the cord diameter becomes so great or the shaped corrugation becomes so large and the coat rubber thickness increases so much that the tire weight undesirably increases. When tan α is less than 0.05, the bending rigidity of the cord becomes high and when it exceeds 0.30, on the other hand, the proportion of the shape of the spiral or corrugated shape becomes so great that productivity drops and the elastic modulus drops because elongation of the cord becomes great. When the steel cord comprises the a×b double twist structure (a=1 to 4, b=2 to 5), the blank wire diameter is 0.1 to 0.25 mm. When the blank wire diameter is less than 0.1 mm, the wire is so thin that the strength becomes low and when the blank wire diameter exceeds 0.25 mm, on the other hand, the bending rigity becomes excessively high. This structure is typified by 3×3 (0.15), for example.

The tape 6 is formed by burying one or a plurality of such steel cords in a matrix in parallel with one another. The matrix in this case is not limited to the rubber, and plastic materials such as a urethane resin can be also used.

EXAMPLE (1) High speed durability, uniformity, driving comfort and maneuvering stability were evaluated under the following conditions for the Tires Nos. 1 to 3 of the present invention, the Comparative Tire 1 and Conventional Tire 1 listed below.

Conditions air pressure: 1.9 kg/cm$^2$, rim: 14×51/2JJ, load: 500 kg, tire size: 195/70 R14

Present Tire 1

The steel cord belt layer had a two-layered structure, and the tape used was formed by burying 10 steel cords 3×3 (0.15) in parallel in a rubber. The tape having a width of 10 mm was wound two times round the outer circumference of the carcass layer at n=2 and θ=8°.

tire outer diameter: 655 mm, width of belt layer D: 135 mm, radius of belt layer r: 315 mm, tanθ=n×D/2πr=n×135 mm (2π×315 mm)

Present Tire 2

The same as the Present Tire 1 except that n=4 and θ=16°.

Present Tire 3

The tape was produced by aligning in parallel five individual wires shaped into the corrugated shape (d=0.30 mm, d+λ=0.60 mm, tanα=0.18) and burying them in a rubber, and had a tape width of 5 mm. The tape was wound two times round the outer circumference of the carcass layer at n=2 and θ=8°. The rest were the same as those of the Present Tire 1.

Comparative Tire 1

The same as the Present Tire 1 except that n=6 and θ=23°.

Conventional Tire 1

Two steel cord belt layers; cord angle in the tire circumferential direction =20°; cord crossed mutually between plies.

inner steel cord belt layer:
  steel cord 2+2 (0.25), 40 ends/50 mm,
  width =130 mm
outer steel cord belt layer:
  steel cord 2+2 (0.25), 40 ends/50 mm,
  width=120 mm
belt reinforcing layer:
  one, formed by winding spirally and continuously a sheet of two-twist cord of nylon fiber of 840 D at 55 ends/50 mm, round the outer circumference of outer steel cord belt layer at width of 10 mm at a very small angle in tire circumferential direction; width =140 mm.

Uniformity:

The test was carried out in accordance with "Uniformity Testing Method of Automobile Tires", JASO C607. The result was indicated by an index using the value of the Conventional Tire 1 as 100. The greater this value, the better uniformity.

High Speed Durability:

After a JATMA high speed durability test using a drum diameter of 1,707 mm was completed, the test was continued at an acceleration rate of 10 km/hr until each test tire was broken. The result was indicated by an index using the value of the Conventional Tire 1 as 100. The greater this value, the higher became the durability.

It could be understood that the smaller the cord angle θ (the smaller the n value), the higher became the high speed durability.

Maneuvering Stability & Driving Comfort

Maneuvering stability was evaluated by a feeling test of an actual car. In this case, the test tires were fitted to a Japanese-make car of a 2.5 l class, and three test panelists evaluated maneuvering feeling by moving thrice the car in the transverse direction. In Table 1, circle "o" represents "very good", double circle "⊙" represents "excellent", triangle "Δ" represents "good" and "X" represents "poor".

Driving comfort was evaluated also by the feeling test. The test tires were fitted to a Japanese-make car of a 2.5 l class; and three test panelists evaluated driving comfort by feeling by driving the car on an irregular road surface. In Table 1, circle "o" represents "very good", double circle "⊙" represents "excellent", triangle "Δ" represents "good" and "X" represents "poor".

TABLE 1

|  | No. of bendings n | cord angle θ | uniformity | high speed durability (index) | driving comfort | maneuvering stability |
| --- | --- | --- | --- | --- | --- | --- |
| Conventional Tire 1 | — | 20° | 100 | 100 | Δ | Δ |
| Comparative Tire 1 | 6 | 23° | 105 | 95 | ⊙ | X |
| Present Tire 1 | 2 | 8° | 100 | 125 | O | ⊙ |
| Present Tire 2 | 4 | 16° | 105 | 115 | ⊙ | O |
| Present Tire 3 | 2 | 8° | 100 | 120 | O | ⊙ |

As can be understood clearly from Table 1, the Present Tires Nos. 1 to 3 were excellent in all the aspects of high speed durability, uniformity, driving comfort and maneuvering stability.

(2) High speed durability, uniformity, driving comfort (bump get-over test) and maneuvering stability were similarly evaluated for the Present Tires Nos. 4 to 6, Comparative Tire 2 and Conventional Tire 2 under the following conditions. The results were tabulated in Table 2.

Conditions air pressure: 1.9 kg/cm$^2$, rim: 14×51/2JJ, load: 500 kg, tire size: 195/70 R14

Present Tire 4

The steel cord belt layer had a two-layered structure, and the tape used was produced by burying ten steel cords 3×3

(0.15) in parallel in a rubber, and had a width of 10 mm. The tape was wound in two layers around the outer circumference of the carcass layer at n=3 and θ=12°.

tire outer shape: 655 mm, width of belt layer D=135 mm, radius of belt layer: r=315 mm, tanθ=n×D/2πr=n×135 mm/(2π×315 mm)

Present Tire 5

The same as the Present Tire 4 except that n=5 and θ=19°.

Present Tire 6

The tape was produced by aligning in parallel five individual wires shaped into the corrugated shape (d=0.30 mm, d+λ=0.60 mm, tanα(=0.18) and burying them in a rubber, and had a tape width of 5 mm. The tape was wound two times round the outer circumference of the carcass layer at n=3 and θ=12°. The rest were the same as those of the Present Tire 4.

Comparative Tire 2

The same as the Present Tire 4 except that n=7 and θ°=26.

Conventional Tire 2

Same as Conventional Tire 1.

TABLE 2

|  | No. of bendings n | cord angle θ | uniformity | high speed durability (index) | driving comfort | maneuvering stability |
| --- | --- | --- | --- | --- | --- | --- |
| Conventional Tire 2 | — | 20° | 100 | 100 | Δ | Δ |
| Comparative Tire 2 | 7 | 26° | 110 | 90 | ⊙ | X |
| Present Tire 4 | 3 | 12° | 105 | 125 | ○ | ⊙ |
| Present Tire 5 | 5 | 19° | 110 | 105 | ⊙ | ○ |
| Present Tire 6 | 3 | 12° | 105 | 120 | ○ | ⊙ |

As can be clearly understood from Table 2, the Present Tires 4 to 6 were excellent in all the aspects of high speed durability, uniformity, driving comfort and maneuvering stability.

As explained above, in the pneumatic radial tire according to the present invention, the tape formed by burying one or a plurality of steel cords in parallel with one another in the matrix is wound round the outer circumference of the carcass layer while the tape is bent zigzag in such a manner as to form the cylindrical steel cord belt layer having the two-layered structure. When the cord angle of the steel cord belt layer in the tire circumferential direction is θ, the width of the steel cord belt layer is D, the radius of the cylinder of the steel cord belt layer is r and the number of zigzag bendings of the tape per circumference of the tire is n, these parameters satisfy the relation tan θ=n×D/2πr and 7° <θ20°, and the steel cord comprises a 0.15 to 0.5 mm-diameter single steel wire shaped into the spiral or corrugated shape in the longitudinal direction thereof or has the a×b twist structure (a=1 to 4 and b=2 to 5) having a blank wire diameter of 0.1 to 0.25 mm. Accordingly, the pneumatic radial tire of the present invention has excellent high speed durability and moreover, can improve uniformity, maneuvering stability and driving comfort.

Further, in the pneumatic radial tire according to the present invention, the steel cord belt layer is formed by winding the tape outside the carcass layer while being bent throughout one circumference of the tire. Therefore, this steel cord belt layer can be produced by the existing belt forming drum that has been used in the past. Since new equipment need not be installed additionally, the pneumatic radial tire can be produced economically.

What is claimed is:

1. A pneumatic radial tire having a belt layer disposed outside a carcass layer on a tread, characterized in that at least one tape produced by burying one or a plurality of steel cords in parallel with one another in a matrix is wound round the outer circumference of said carcass layer while being bent zigzag in such a manner as to form a cylindrical steel cord belt layer having a two-layered structure, a cord angle θ of said steel cord belt layer in a tire circumferential direction, a width D of said steel cord belt layer, a radius r of the cylinder of said steel cord belt layer and the number of zigzag bendings n of said at least one tape per circumference of said tire satisfy the relations tan θ=n×D/2πr and 7°<θ<20°, the number of zigzag bendings being less than 6, and said steel cord either, is a 0.15 to 0.5 mm-diameter single steel wire shaped into a spiral or corrugated shape in the longitudinal direction thereof or has an a×b twist structure a=1 to 4 and b=2 to 5 of blank wires having a diameter of 0.1 to 0.25 mm.

2. A pneumatic radial tire according to claim 1, wherein the number of zigzag bendings per circumference of said tire is even numbered.

3. A pneumatic radial tire according to claim 1, wherein the number of zigzag bendings n is odd-numbered.

4. A pneumatic radial tire according to claim 1, wherein the number of zigzag bendings n is 3 or 5.

5. A pneumatic radial tire according to any of claims 1, 2, or 4, wherein said steel cord is a 0.15 to 0.5 mm-diameter single steel wire shaped into a spiral or corrugated shape in the longitudinal direction thereof, and the diameter d of said single wire, an amplitude λ of said single wire and an angle of inclination α of said single wire with respect to the longitudinal direction of said cord satisfy the relation d+λ≦1.0 mm and 0.05<tan α≦0.30.

6. A pneumatic radial tire according to any of claims 1, 2, or 4, wherein said matrix is a member selected from the group consisting of rubbers and plastics.

7. A pneumatic radial tire according to any of claims 1, 2, or 4, wherein the width of each said tape formed by burying one or a plurality of steel cords is not greater than 15% of the width D of said steel cord belt layer.

* * * * *